United States Patent [19]

Nachbar et al.

[11] Patent Number: 5,194,215
[45] Date of Patent: Mar. 16, 1993

[54] AUTOMATED ROBOTIC EQUIPMENT FOR ULTRASONIC INSPECTION OF PRESSURIZER HEATER WELLS

[75] Inventors: Henry D. Nachbar, Ballston Lake; Raymond S. DeRossi, Amsterdam; Lawrence E. Mullins, Middle Grove, all of N.Y.

[73] Assignee: The United States of America as represented by the United States Department of Energy, Washington, D.C.

[21] Appl. No.: 762,967

[22] Filed: Sep. 20, 1991

[51] Int. Cl.⁵ .......................................... G21C 17/017
[52] U.S. Cl. .................................. 376/249; 376/245; 376/307; 165/112; 73/623; 414/7; 414/8
[58] Field of Search .............. 376/245, 249, 252, 307; 165/11.2; 414/7, 8; 73/623

[56] References Cited

U.S. PATENT DOCUMENTS

| | | | |
|---|---|---|---|
| 4,036,373 | 7/1977 | Taenzi et al. | 214/1 BB |
| 4,096,757 | 6/1978 | Ishii et al. | 73/621 |
| 4,597,294 | 7/1986 | Brill, III et al. | 73/623 |
| 4,663,727 | 5/1987 | Saporito et al. | 364/551 |
| 4,710,710 | 12/1987 | Flora et al. | 324/220 |
| 4,728,479 | 3/1988 | Merkovsky | 376/203 |
| 4,757,258 | 7/1988 | Kelly, Jr. et al. | 324/220 |
| 4,856,354 | 8/1989 | Overbay | 73/886.5 |
| 4,996,018 | 2/1991 | Bhatt et al. | 376/203 |

FOREIGN PATENT DOCUMENTS

| | | | |
|---|---|---|---|
| 0034711 | 10/1970 | Japan | 376/245 |
| 147051 | 9/1982 | Japan | 73/623 |
| 2046911 | 11/1980 | United Kingdom | 73/623 |

Primary Examiner—Donald P. Walsh
Assistant Examiner—Chrisman D. Carroll
Attorney, Agent, or Firm—Virginia B. Caress; William R. Moser; Richard E. Constant

[57] ABSTRACT

A robotic device for remotely inspecting pressurizer heater wells is provided which has the advantages of quickly, precisely, and reliably acquiring data at reasonable cost while also reducing radiation exposure of an operator. The device comprises a prober assembly including a probe which enters a heater well, gathers data regarding the condition of the heater well and transmits a signal carrying that data; a mounting device for mounting the probe assembly at the opening of the heater well so that the probe can enter the heater well; a first motor mounted on the mounting device for providing movement of the probe assembly in an axial direction; and a second motor mounted on the mounting device for providing rotation of the probe assembly. This arrangement enables full inspection of the heater well to be carried out.

16 Claims, 3 Drawing Sheets

AUTOMATED ROBOTIC EQUIPMENT FOR ULTRASONIC INSPECTION OF PRESSURIZER HEATER WELLS

FIELD OF THE INVENTION

This invention relates to ultrasonic inspection of the heater wells of a pressurizer in a pressurized water power plant and, more particularly, to an automated robotic system for carrying out such inspections.

BACKGROUND OF THE INVENTION

In a pressurized water nuclear power plant, a pressurizer is required to maintain constant pressure in the primary high pressure temperature loop. The pressurizer is generally about half full of water in a liquid state and half full of water vapor in the form of a bubble. As the liquid water is heated by the electric heaters of the pressurizer, the water vapor bubble increases in size, thereby increasing the pressure in the primary system and thus helping to maintain constant plant pressure even when there are variations in the operating conditions of the plant.

The heaters in the pressurizer are located in heater wells that fit into holes in the shell strength wall of the pressurizer. The heater wells are welded to the wall to form a leak proof boundary for the liquid water within the pressurizer.

It is necessary from time to time to evaluate the integrity of the base metal of the heater well in addition to that of the attachment metal weld between the heater well and the shell pressure boundary wall of the pressurized vessel. Ultrasonic signals are used in this evaluation to detect metal cracks and lack of weld fusion, and such an ultrasonic inspection is normally carried out during manufacture of the pressurizer and is repeated in the field after the pressurizer has undergone extensive use to check the integrity of the pressurizer. Conventionally, heat well inspection has been carried out manually, both at the time of manufacture and later in the field after extensive operation. The process is slow and is sometimes non-repeatable when defects are found. Further, this approach is very costly in terms of money as well as in terms of radiation exposure to operating personnel who must hold a manual ultrasonic probe in a nuclear power plant environment.

SUMMARY OF THE INVENTION

According to the invention, an automated robot is provided which has the advantages of quickly, precisely, and reliably acquiring data with respect to the condition of pressurized heater wells at reasonable cost while also reducing the radiation exposure of an operator while inspecting the heater wells.

In accordance with the invention, an automated robotic device for providing inspection of pressurizer heater wells, the device comprising: a probe assembly including probe for entering a heater well, for gathering data regarding the condition of the heater well and for producing a signal carrying that data; a mounting means for mounting the probe assembly at the opening of the heater well so that the probe can enter the heater well; a first motor subassembly mounted on the mounting means for providing movement of the probe assembly in an axial direction; and a second motor subassembly mounted on the mounting means for providing rotation of the probe assembly.

Preferably, the mounting means includes hollow shaft having a central opening therein into which the probe extends and which permits electrical connection of said probe to the exterior of the shaft and allow a fluid to enter the heater well.

In accordance with a preferred embodiment, the robotic device includes a support sleeve which is mounted for axial movement on the mounting means and on which the probe assembly is mounted and the first motor subassembly comprises a first motor carriage secured to the sleeve, a first motor supported by the carriage, a threaded drive screw driven by the motor and mounted on said a fixed portion of the mounting means such that rotation of the screw provides axial movement of the sleeve and thus of said probe assembly, and at least one limit device attached to the threaded drive screw for limiting the axial movement of the probe assembly. The second motor subassembly preferably comprises a second motor carriage attached to the sleeve, a second motor supported by the carriage, and a gear and pinion means driven by the second motor for imparting rotational motion to the probe assembly.

As stated above, the mounting means preferably includes a hollow mounting shaft into which the probe assembly extends and a clamping sleeve is preferably provided which secures that shaft to the exterior of the heater well.

The probe means advantageously comprises an ultrasonic probe although other probes can also be used as discussed below.

The robotic device preferably comprises a reference means for initially orientating the robotic device to provide a reference. The reference means advantageously means comprises an indexing fork mounted on the mounting means and connected at one end thereof to a further heater well so as to fix the probe in a predetermined starting position with respect to the further heater well.

Preferably, an encoder means is connected to the probe for encoding the data received from the probe with positional information. The encoder means advantageously comprises an encoder connected to the motor of the first motor subassembly for determining the axial displacement of the probe within the heater well with respect to a starting or reference position. The encoder means preferably further comprises an encoder connected to the motor of the second motor subassembly for determining the rotational displacement of said probe in said heater well with respect to a starting position.

Preferably, the robotic device further comprises volume reducing means for reducing the volume of fluid utilized in the inspection of the heater well. In one preferred embodiment, the reducing means comprises a base, a rod attached to the base, a plug attached to the rod, and frictional contacts on the plug for providing a watertight seal between an inner wall of the heater well and the plug. In another preferred embodiment, the volume reducing means comprises an expandable bladder attached to said probe means and providing a container for said fluid.

Preferably, the robotic device further comprises a control station for receiving the signals from the probe and for controlling the first and second motor assemblies.

Other features and advantages of the invention will be set forth in, or apparent from, the following detailed description of the preferred embodiment of the invention.

DESCRIPTION OF THE PREFERRED EMBODIMENTS

Figure 1:
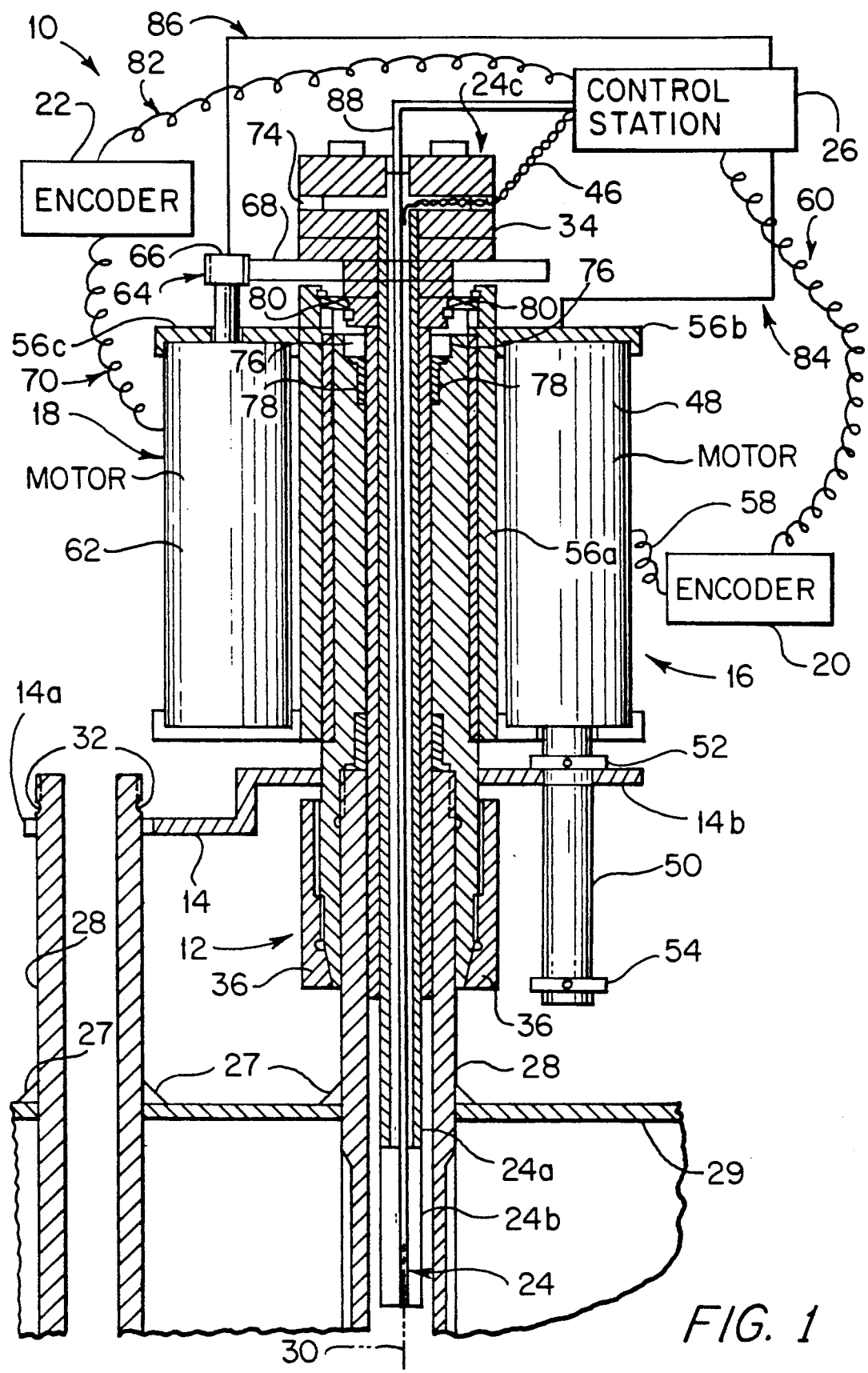
FIG. 1 is a front cross sectional view of a robot constructed in accordance with a preferred embodiment of the invention, shown in the extended position.
Figure 2:
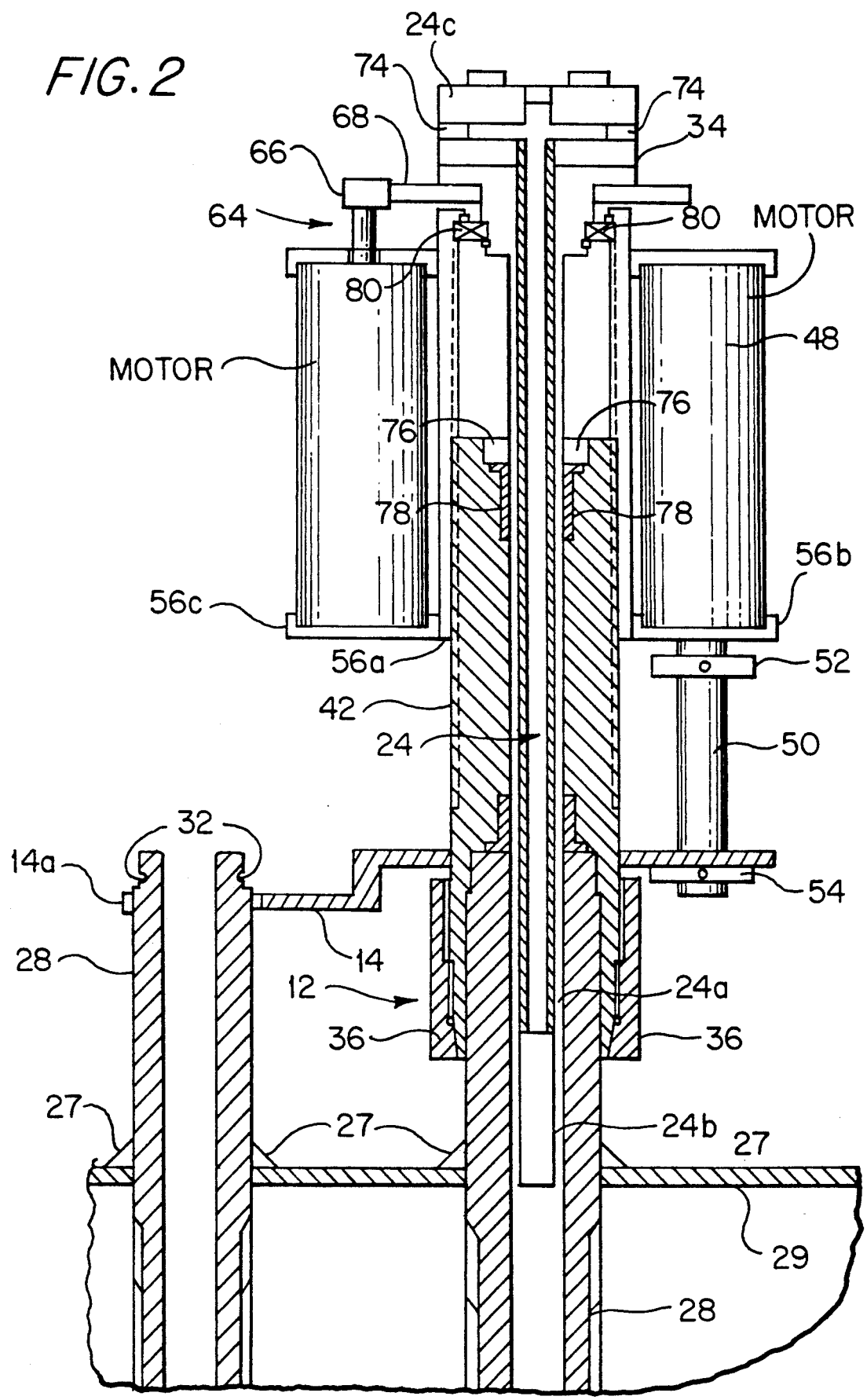
FIG. 2 is a partial front cross sectional view, of the robot of FIG. 1, which illustrates the robot in a retracted position.

Referring to FIGS. 1 and 2, a robotic device, generally denoted 1, is illustrated in an inserted position in FIG. 1 and in a retracted position in FIG. 2. The robotic device 10 includes the following major units or components: a mounting assembly 12, an orientation tab or indexing fork 14, motor driven sub-assemblies 16 and 18, a pair of encoders 20 and 22, a probe assembly 24, a control station 26, and an optional water reduction device described in connection with FIGS. 2 and 3.

Considering the mounting assembly 12 for robot device 10, FIGS. 1 and 2 illustrate a pair of heater wells 28 welded by welds 27 to a shell pressure boundary wall 29, and the holding or mounting assembly 12 is used to attach the robotic device 10 to a heater well, and in this case the rightmost heater well 28, so that the centerline 30 of a splined shaft 42 of the robot device 10 is concentric with the centerline of the heater well 28. The robot device 10 securely fastens to the exterior of the heater well 28 by virtue of splined shaft 42 engaging a notch 32 in the outer periphery of the heater well 28. The splined shaft 42 of the robot device 10 is locked into position by a clamping sleeve or collar 36 or other suitable fastening means. Thus, splined shaft 42 is prevented from moving and is utilized to support the motor assemblies 16 and 18 as well as the probe assembly 24. In the illustrated embodiment, clamping sleeve 36 screws into the end of splined shaft 42 and the inclined inner surface of clamping sleeve 36 engages a tapered surface at the end of splined shaft 42. The parts of the mounting assembly 12 are made of a material with high tolerance for radiation and heat exposure.

Affixed to splined shaft 42 is an orientation tab or indexing fork 14. One use of orientation tab or indexing fork 14 is to position the robotic device 10 with respect to a fixed reference so that signals from probe 24 can be related to a common reference point. By relating the signals to a reference point, testing performed at a later date may be compared to the earlier test results to determine the change in these signals. In the illustrated preferred embodiment, the index fork 14 fits around splined shaft 42 and engages by means of a forked end 14a the next adjacent heater well 28. By fastening the robotic device 10 to the next heater well 28, the device 10 is provided with additional stability as well as with a convenient reference point.

A mounting sleeve or collar 56a surrounds splined shaft 42 and includes grooves therein which engage the splines on shaft 42 so that mounting sleeve 56a and the motors 48 and 62 supported thereon can move axially but cannot rotate. The axial position of mounting sleeve 56a is controlled by motor 48 as explained below. Electrical wires 46 extend along the centerline 30 of splined shaft 42 from a control station 26 to an elongate probe carrier 24 of probe assembly 24 which is suspended so as to extend along the centerline 30 of splined shaft 42. Probe assembly 24 includes a probe 24b at the lower end of probe carrier 24a and an upper or head portion 24c which is supported by sleeve 56a. In a preferred embodiment, the probe 24b is an ultrasonic probe and the arrangement provided permits water to be passed to and from probe 24b so that the water can act as a signal coupler as required to enable transmission of the probe generated signals to the metal of the wall of the heater well 28 and return of the signal reflection to the probe 24b. The probe 24b then sends the reflected signals to the control station 26 where the signals are indexed and recorded.

Water is allowed to exit from the device by exit orifices 74 in upper portion 24c of probe assembly 24. In this regard, portion 24c comprises a gasket 34 therein and splined shaft 42 includes seals 76 and bushings 78 to allow for movement of sleeve 56a along the splined shaft 42 without the loss of water. Probe assembly 24 is mounted by means of bearing 80 on sleeve 56a so as to enable rotation of the probe assembly 24. Probe assembly 24 is designed so as to be removable from the remainder of the device when the device is mounted in a heater well 28 simply by lifting the probe assembly 24 out of its mounting. This removable feature allows the use of the same mounting assembly 12 to attach different types of probe assemblies including boroscopes, laser annealing probes, and induction heating annealing probes.

Motor subassembly 16 causes movement of mounting sleeve or collar 56a and thus of probe assembly 24, in a forward or reverse axial direction (i.e., up and down as shown in FIGS. 1 and 2). Motor subassembly 16 includes motor 48 which imparts a selected rotational speed to a threaded screw rod or drive screw 50 driven by the output shaft of motor 48 and extending axially downwardly therefrom. The other end 14b of indexing fork 14 includes a threaded aperture therein which receives drive screw 50 so that rotation of drive screw 50 causes axial movement of the motor assemblies 16 and 18 and probe assembly 24. The screw rod or drive screw 50 includes upper and lower stops 52 and 54, respectively. These stops 52 and 54 limit the maximum axial displacement of the sleeve 56a and the associated motor and probe assemblies.

Motor 48 is secured to the robotic device 10 by a carriage 56b. In a preferred embodiment, the carriage 56b is integrally attached to sleeve 56a. Thus, when rod 50 is rotated by motor 48, the collar 56a and carriage 56b move axially along splined shaft 42 until either the upper or lower stops 52 or 54 come into contact with indexing fork 14. It should be noted that while motor 48 is depicted as an electrical motor, hydraulic actuators or any other motion imparting device may be use in its place.

A positional signal is sent from the motor 48 to an encoder 20 via a wire connection 58. Encoder 20 determines the number of revolutions of motor 48 in relation to the axial position of sleeve 56a so that the axial position of probe assembly 24 can be determined in relation to the signal received by probe 24b. Encoder 20 transmits this positional information to the control station 26 via a wire connection 60.

The second motor driven subassembly 18 provides complete rotation of probe assembly 24, i.e., between 0° to 360°, within the splined shaft 42. Thus, the probe 24b of robot device 10 can completely inspect 100% of inside wall of the heater well 28. Motor subassembly 18 includes a motor 62 selected to provide a desired speed relationship with respect to a gear drive 64. Gear drive 64 comprises a gear 66 driven by motor 62 and a pinion 68 affixed to probe assembly 24 for imparting rotational motion thereto. Motor 62 is mounted on the robotic device 10 by carriage 56c and in a preferred embodiment, carriage 56c is integrally secured to collar 56a. Although motor 62 is depicted as an electrical motor, it will be understood that, as noted above, hydraulic actuators or any other motion imparting device may be used in its place.

A positional signal is sent from the motor 62 to an encoder 22 via wire connection 70. Encoder 22 determines the revolutions of motor 62 with respect to the angular position of probe assembly 24 so that the rotational position of probe assembly 24 can be determined in relation to the signal received by probe 24. Encoder 22 transmits this positional information to the control station 26 via a wire connection 82.

A control station 26 controls operation of motors 48 and 62 by power line connections 84 and 86, respectively. The control station also receives positional information from encoders 20 and 22; stores the positional information and signals received from probe 24; and controls water flow and pressure by water line 88. Control station 26 is fully automated so that a complete scan of the heater well 28 is automatically provided. Data collected from the probe signal may be directed by the control station 26 to a printer, display, or storage device. A manual override (not shown) is available at the control station so that an operator can stop the robotic device and manually control the device so that a particular area of the heater well 28 may be examined.

Figure 3:
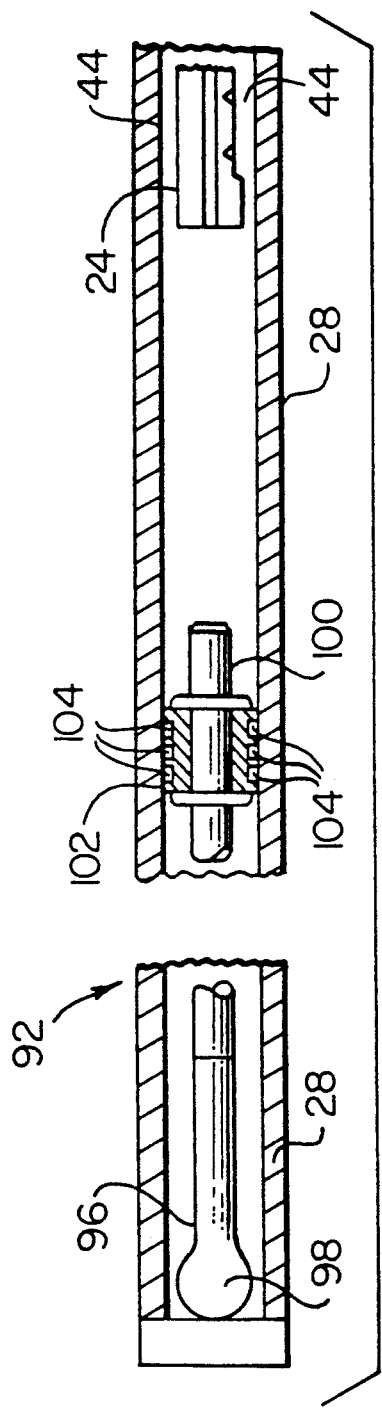
FIG. 3 is a cross sectional view of a water reduction device utilized with the robot of FIG. 1.
Figure 4:
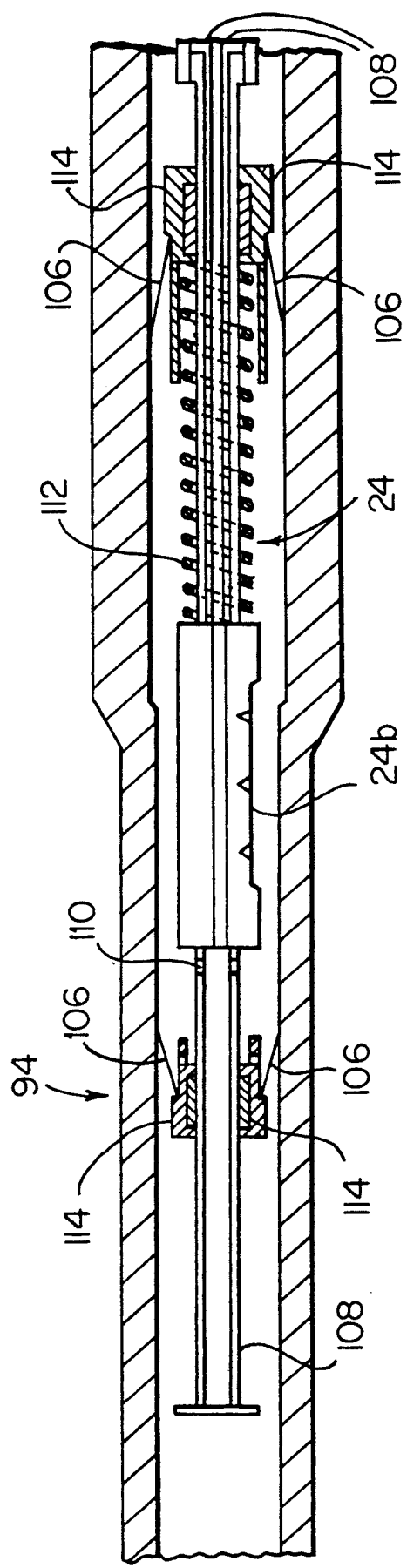
FIG. 4 is a cross sectional view of an alternative water reduction device utilized with the robot of FIG. 1.

In a preferred embodiment, the robot device 10 also incorporates a water reduction device, one embodiment of which is illustrated in FIG. 3 and is generally denoted 92 and a second embodiment of which is illustrated in FIG. 4 and is generally denoted 94. In general, the water reduction device is used to limit the volume of water introduced into the heater well for coupling the probe assembly 24 to an interior surface of the heater well 28. While this water reduction device is optional, the device provides the advantage of saving a considerable amount of water, i.e., eliminates the need to fill the entire heater well 28 with water.

Referring to FIG. 3, water reduction device 92 is a water plug assembly that is placed just beyond the area to be inspected, thus requiring only the inspected area to be filled with water. The plug assembly 92 comprises a depth control rod 96 having a bulbous base 98 and a threaded end 100 which attaches to an insertion tool (not shown). Mounted on rod 96 is a plug 102 which fastens, by frictional fit seals 104, to the interior surface of heater well 28 and thus forms a watertight seal between the plug 102 and well 28.

Referring to FIG. 4, the water reduction device 94 illustrated is an inflated bladder assembly. Bladder assembly 94 incorporates an expanding bladder 106 which when inflated, contains pressurized water. A bladder travel shaft 108 is provided to give support to both ends of the bladder 106 and to also provide a conduit for the pressurized water. Sealing members 114 provide an watertight seal between bladder 106 and shaft 108. Water enters the bladder via fill holes 110 in shaft 108. A spring 112 is provided to resiliently bias probe 24 to the 10 west position on shaft 108 when the bladder 106 is deflated. When the bladder 106 is inflated, the spring tension of spring 112 is overcome and probe 24 resides between the ends of the bladder 106.

Considering the overall operation of the robotic device 10, a determination is made if a water reduction device is to be utilized. If a plug 92 is utilized, the plug is positioned before the robotic device 10 is installed. If a bladder assembly 94 is used, the bladder assembly is an integral part of the probe assembly 24. Next, the splined shaft 42 is positioned above a first heater well 28 in such a manner as to allow the forked end 14a of orientating tab 14 to be placed around the next adjacent heater well 28 as discussed above. The splined shaft 42 is secured to the first heater well as described previously. The appropriate probe assembly (corresponding to probe assembly 24) is selected and mounted to the mounting sleeve 56a. Next, collar 56a is connected to splined shaft 42 so that the threaded screw rod 50 engages indexing fork or orientating tab 14. The lower stop 54 is then attached to the screw rod. It should be noted that if the probe does not need to be changed, the probe assembly 24, collar 56a, and lower stop 54 may already be attached from the last use. At this time, an operator, located at the control station 26, activates the control station 26.

The control station 26 controls the operation of motors 48 and 62, provides pressurized fluid into the heater well 28 by water line 88, and receives, stores, and displays data from the probe 24b and encoders 20 and 22. An automated cycle is initiated in which the collar 56a and probe 24 is first lowered a predetermined distance and then is rotated in a 360° arc. Information about the heater well 28 is relayed to the control station 26 by probe 24 and this information is stored with positional information from the encoders 22 and 24. After one complete cycle is finished, the next cycle is initiated. This process is continued until the upper stop 52 on threaded screw rod 50 comes into contact with orientating tab 14 or the cycle is manually interrupted.

Although the present invention has been described to specific exemplary embodiments thereof, it will be understood by those skilled in the art that variations and modifications can be effected in these exemplary embodiments without departing from the scope and spirit of the invention. An example of such a modification concerns the adaptation of this device to horizontal heater wells as well as resistance temperature detector wells. Additionally, the invention can be adapted to accommodate different sizes of heater wells, different internal bores of the shaft, and other variations.

What is claimed is:

1. An automated robotic device which can be used in a horizontal or vertical position for providing inspection of pressurizer heater wells, said device comprising:

a removable probe assembly, liftable from a mounting means, including probe means for entering a heater well, for gathering data regarding the condition of the heater well and transmitting a signal carrying said data;

a mounting means for mounting said probe assembly at the opening of the heater well so that the probe means can enter the heater well, wherein said mounting means includes a hollow mounting shaft into which said probe assembly extends and a clamping sleeve for securing said shaft in place on the exterior of the heater well;

a first motor subassembly mounted on said mounting means exterior to said mounting shaft for providing movement of said probe assembly in an axial direction; and a second motor subassembly mounted on said mounting means exterior to said mounting shaft for providing movement of said probe assembly in an axial direction; and a second motor subassembly mounted on said mounting means exterior to said mounting shaft for providing rotation of said probe assembly.

2. The robot recited in claim 1 wherein said hollow mounting shaft has a central opening therein into which said probe means extends and which permits electrical connection of said probe means to the exterior of said shaft and allows a fluid to enter the heater well.

3. The robotic device recited in claim 1 wherein said device includes a support sleeve which is mounted for axial movement on said mounting means and on which said probe assembly is mounted, and wherein said first motor subassembly comprises a first motor carriage secured to said support sleeve, a first motor supported by said carriage, a threaded drive screw driven by said motor and mounted on said a fixed portion of said mounting means such that rotation of said screw provides axial movement of said support sleeve and thus of said probe assembly, and at least one limit device attached to said threaded drive screw for limiting the axial movement of said probe assembly.

4. The robotic device recited in claim 3 wherein said second motor subassembly comprises a second motor carriage attached to said support sleeve, a second motor supported by said carriage, and a gear and pinion means driven by said second motor for imparting rotational motion to said probe assembly.

5. The robotic device recited in claim I wherein said device further comprises a support sleeve which is mounted for axial movement on said mounting means and on which said probe assembly is, mounted and wherein said second motor subassembly comprises a motor carriage attached to said support sleeve, a motor supported by said carriage, and a gear and pinion means driven by said motor for imparting rotation motion to said probe assembly.

6. The robotic device recited in claim 1 wherein said probe means comprises an ultrasonic probe.

7. The robotic device recited in claim 1 further comprising a reference means for initially orientating said robotic device to provide a reference.

8. The robotic device recited in claim 7 wherein said reference means comprises an indexing fork mounted on said mounting means and adapted to be connected at one end thereof to a further heater well so as to fix said probe means in a predetermined starting position with respect to the further heater well.

9. The robotic device recited in claim 1 further comprising encoder means connected to said probe means for encoding the data received from said probe means with positional information.

10. The robotic device recited in claim 9 wherein said encoder means comprises an encoder connected to a motor of said first motor subassembly for determining the axial displacement of said probe means within said heater well with respect to a starting position.

11. The robotic device recited in claim 10 wherein said encoder means further comprises an further encoder connected to a motor of said second motor subassembly for determining the rotational displacement of said probe means in said heater well with respect to a starting position.

12. The robotic device recited in claim 9 wherein said encoder means comprises an encoder connected to a motor of said second motor subassembly for determining the rotational displacement of said probe means in said heater well with respect to a starting position.

13. The robotic device recited in claim I further comprising volume reducing means for reducing the volume of fluid utilized in the inspection of the heater well.

14. The device recited in claim 13 wherein said volume reducing means comprises a base, a rod attached to said base, a plug attached to said rod, and frictional contacts on said plug for providing a watertight seal between an inner wall of the heater well and said plug.

15. The device recited in claim 13 wherein said volume reducing means comprises an expandable bladder attached to and surrounding said probe means wherein said bladder is expanded by filling with said fluid.

16. The robotic device recited claim 1 further comprising a control station for receiving said signals from said probe means and for controlling said first and second motor subassemblies.

* * * * *